Oct. 16, 1951 — C. F. BALL ET AL — 2,571,180
STEERING OPERATED CONTROL MECHANISM FOR ELECTRIC
MOTOR DRIVES OF VEHICLES
Filed Aug. 16, 1946 — 3 Sheets-Sheet 1

Inventors
Charles F. Ball.
James W. Woolf.
by
Louis A. Maxam
Atty.

Inventors:
Charles F. Ball.
James W. Woolf.
by Louis A. Watson
att'y.

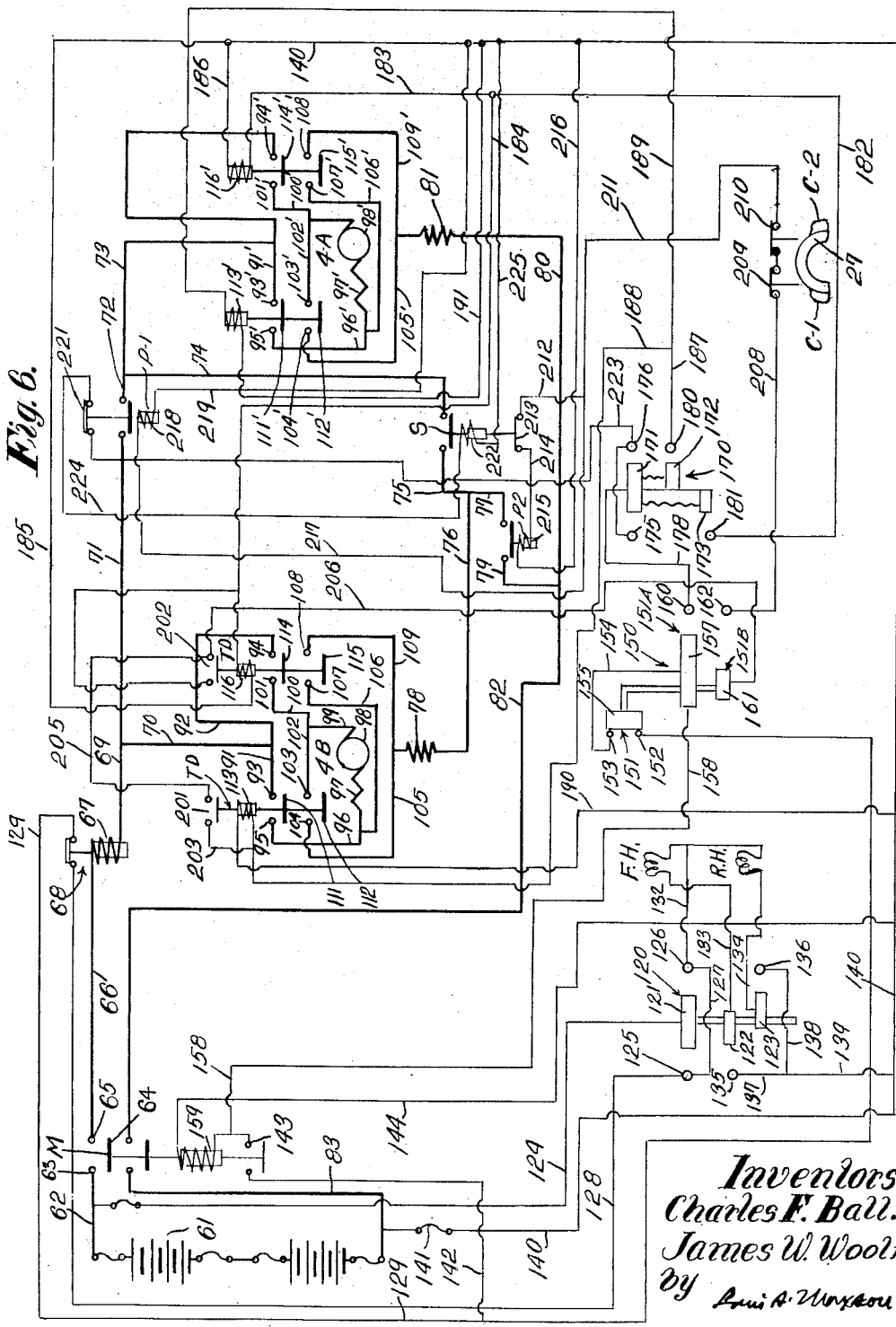

Patented Oct. 16, 1951

2,571,180

UNITED STATES PATENT OFFICE 2,571,180

STEERING OPERATED CONTROL MECHANISM FOR ELECTRIC MOTOR DRIVES OF VEHICLES

Charles F. Ball and James W. Woolf, Franklin, Pa., assignors to Joy Manufacturing Company, a corporation of Pennsylvania Application August 16, 1946, Serial No. 690,856

6 Claims. (Cl. 180—6.28)

This invention relates to electrically driven vehicles, and more particularly to such vehicles especially adapted to use in mines. From another aspect it relates to electrical power systems for motor vehicles.

In mining operations there are many uses for a low, readily steerable, electric motor driven—generally by storage batteries—vehicle which can be used for the transportation of tools, men or materials about the mine passageways, and such vehicles have particular utility in trackless mining, though not at all limited thereto. For maximum utility, it is desirable that they be able to go almost any place in a mine where passageways are available, and that they be able to travel at different speeds under different conditions, and that they be able to maneuver about corners and elsewhere on very short radii. Because of the nature of their use, it has been found that it is very desirable to use series motors, one for each of a pair of wheels at one end of the vehicle, and to be able to operate such motors either in series with each other or in parallel. Such an arrangement is peculiarly adapted to use with a vehicle having its normally rear wheels each separately motor driven, and utilizing a centrally disposed steering wheel arrangement at its normally forward end. Such an arrangement through the special nature of the loads imposed by the steering, especially on very sharp turns, makes possible in effect an electrical differential action of a peculiarly desirable nature.

It will be understood that each separately motor driven driving wheel sets up forces which tend to shift—to move bodily—the steering wheel towards the opposite side of the straight path along which the machine travels when the steering device is centrally adjusted. When the steering wheel or wheels are rotating on an axis or on axes in a plane to which the axial line of the vehicle is perpendicular, these forces balance each other out in practice. Then each motor nicely counterbalances the action of the other, and the vehicle moves forwardly smoothly and easily in a straight line. When the steering wheel or wheels are angled towards one side or the other, the driving wheel at the side towards which they are angled is placed under an increased load and tends to move the steering wheel or wheels transversely to their planes of rotation, and when the steering adjustment is such as to secure very sharp turning, the load on the motor on the inside of the turn is much increased while the load on the other motor is not correspondingly affected by the wheel-angle. By choosing motor power sufficient for transportation needs but preferably below that which would tend to produce undesired skidding of the steering wheel tires, by providing for the change from parallel operation of the motors which drive the wheels to operation in series when sharp turns are to be negotiated, and, if desired, though this is not essential with respect to the broader aspects of our invention, providing means for effecting an automatic change from parallel to series connection when the horizontal angle of the steering wheels to the axial line of the body of the vehicle exceeds a predetermined selected number of degrees, a very efficient arrangement can be produced, and is produced, by our invention.

An object of our invention is to provide an improved, highly maneuverable electrically driven vehicle. Another object of our inention is to provide an improved motor control system. Still another object of our invention is to provide an improved series motor driven vehicle, having improved means for effecting the operation of its mutually independent driving motors in series or in parallel, and having particularly cooperation between the motors and a centrally arranged steering mechanism so that an electrical differential is in effect produced. Still a further object of our invention is to provide an improved electrical controlling means for the driving motors of a readily steerable vehicle. Other objects and advantages of our invention will appear in the course of the following specification and the appended claims.

In the accompanying drawings, in which one illustrative embodiment of our invention in its broader aspects, and including a refinement which is desirable, but not essential to the broader aspects of our invention, is shown for purposes of illustration.

Fig. 6 is a diagrammatic drawing of the circuits and control devices of the vehicle illustrated in the other figures.

Figure 7:
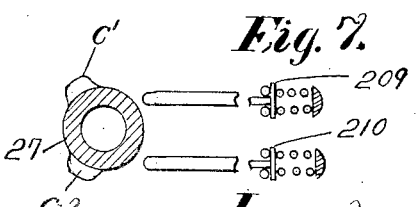

And Fig. 7 is a fragmentary diagrammatic sectional view showing one arrangement for securing steering angle control of motor hook-up.

Referring now to the drawings, and initially to the first two sheets thereof, it will be observed that we have shown a vehicle 1 having at the opposite sides of its rear end propelling or traction wheels 2 and 3. Each of these wheels has its own driving motor 4, these motors being designated in the diagrammatic view, however, 4A and 4B. Each motor may drive its respective associated wheel through any suitable form of reduction and transmission gearing, and as suited for the purpose we have shown a drive from the motor shaft 5, through a pinion 6 on the latter, to a larger gear 7 mounted on a worm shaft 8 of which the worm 9 engages and drives a worm wheel 10 on a shaft or axle 11 to which, at its outer end, the hub 12 of a rubber tired wheel 13 is keyed at 14. The several rotating parts mentioned are suitably journaled in a multipart casing 15 supported as at 16, 17, with the motor 4, on a side wall of the body 18 and on a flange or shelf 19 secured to said side wall in any suitable manner. Each of the motors 4 is a series motor, D. C., and designed to be battery driven in the normal use of the apparatus. Brakes, not shown, may be provided for the wheels. Each is of a power suited to the needs of the apparatus, and of a speed suited to provide the desired operating speed with reduction gearing as described. The motors are intended to be driven in series or in parallel, as later described.

For the steering of the apparatus there is mounted in a suitably shaped casing 20 formed at the forward end of the vehicle, by means of any suitable bearing arrangement 21, a vertically extending tubular shaft 22, having a collar 23 secured to its lower end, and this collar carries a pair of oppositely disposed stub axles 24, 24, for receiving pneumatic tired wheels 25. The axles 24, 24 slope downwardly from the collar 23, so that the bottom or ground-contacting surfaces of the wheels 25 are close together, and in effect may be considered as providing a single wheel of dual construction for supporting the front end of the vehicle.

The tubular shaft 22 has a worm wheel 27 secured to its upper end, and a worm carrying a shaft 28, suitably fixed against axial movement and carrying a worm (not shown) engaged with the worm wheel 27 is adapted to turn the steering wheels and to hold them in different adjusted positions. A universal joint 30 connects the worm carrying shaft 28 with a hand wheel controlled shaft 31 which is turned by means of a hand wheel 32, the outer end of the shaft 31 being rotatably supported by a suitable bracket 33 secured to the vehicle body.

A driver's compartment 35 is provided at the left forward end of the vehicle, and an operator is able to seat himself on a plate 36 on the bottom of this compartment and support his back against an upwardly bent portion of this plate and operate and control the wheel 32, and also certain other mechanisms which will shortly be described.

The vehicle is provided with battery compartments 37 at its opposite sides, and if either of these be not needed for battery use, obviously it may be used as a utility compartment. The large space 40 between the battery boxes and rearward of the steering mechanism and the operator's or control compartment is provided for the transport of men, tools or materials. A compartment 41 at the side opposite the operator's compartment may be used for the housing of the controls which will shortly be explained. The vehicle has desirably front and rear headlights, of which only the former, 42, is shown. Arranged at the forward end of the operator's space is a foot lever 44, pivoted between its ends as at 45 and movable by the foot of an operator, providing for the control of a high-low and reset mechanism later described, and there also extends into the right hand side of the operator's space a handle 46 controlling through suitable connections not shown a forward and reverse switch mechanism. Finally there projects into the operator's space near the rearward end thereof a handle 47 controlling the headlights and a so-called safe-off device. Other, conventional mechanisms not per se affecting the invention are provided but need not be described in detail.

In the illustrative embodiment of the invention, as will more fully appear as a description of Fig. 6 is given, there are the two wheel driving motors 4A and 4B. Each of these is a series motor with a commutating winding, an armature, and a series field. Each is reversible by forward and reverse contactors. The direction of motor rotation is controlled by the forward and reverse selective switch mechanism controlled by the handle 46. The fast-slow and reset mechanism causes the motors always to be started in series, even when the control lever 45 is pushed through the starting, series-connection effecting position, immediately to the parallel connection position, and also provides for these positions, a reset position, in which it is normally held by a spring 55, a partway-forward position in which it establishes series relation between the two motors, and an all-the-way forward position, in which the two motors are connected to the battery in parallel. The safe off and front and rear light mechanism is a safety switch mechanism which requires operation before the other control devices can be operated to effect any results, and which requires one or the other headlights to be on before the vehicle can be set in motion.

As will be seen, one motor is always operated when either is running. When a series switch, S, later described, is closed, motors 4A and 4B are connected in series across the lines from the battery. One motor will then be very briefly shorted out while the other is connected across the battery, the series switch will then be opened, and then a third switch will be closed and by it the other motor will be connected across the battery in parallel with the first.

Referring now to the diagrammatic view, Fig. 6, it will be noted that the motors are designated 4A and 4B. The battery is shown at 61. Its positive end is connected by a conductor 62 with one contact 63 of a main line switch 64. The opposite contact 65 is connected by a conductor 66 to the coil 67 of an overload relay 68. The other end of coil 67 is connected to a conductor 69. A conductor 70 connects conductor 69 with the reversing system of motor 4B, while a conductor 71 connects the conductor 69 with one side of a switch P1, of which the other side is connected to a conductor 72 from which branches 73 and 74 lead respectively to the reversing system of motor 4A and to one side of another switch S of which the other side is connected by a conductor 75 to conductors 76 and 77, the first of which is connected with the series field 78 of motor 4B, while the second leads to another switch, P2, whose opposite side is connected by a conductor 79 and a conductor 80 with the series field 81 of motor 4A, and by a conductor 82 to one side of the other half of the main line switch, and the opposite side of this half of the switch is connected by a suitably fused connection 83 with the negative end of the battery.

The reversing systems proper of the motor 4A and 4B are the same, and so the system associated with motor 4B only will be described. Conductor 70 is connected by conductors 91 and 92 to switch contacts 93 and 94 respectively. A contact 95, connectible by a switch element with the contact 93 is connected by a conductor 96 with the commutating winding 97 of motor 4B and through such winding to the armature 98, through an appropriate brush arrangement. The other brush arrangement is connected by a conductor 99 to conductors 100, leading to a contact 101 opposite contact 94 and conductor 102, leading to a contact 103, whose associated contact 104 is connected by a conductor 105 with the series field 78. From the conductor 96 there are branches of conductor 106 leading to a contact 107, whose associated contact 108 is connected by a conductor 109 also to the series field 78. Contact members 111 and 112 moved concurrently by a solenoid 113 are adapted to connect contact 93 with contact 95 and contact 103 with contact 104, when the solenoid is energized as later explained. Contacts 114, 115, moved concurrently by a solenoid 116, are adapted to connect, when moved to closed positions, the contact 94 with the contact 101 and the contact 108 with the contact 107. There is an interlock associated with each of the switch devices just described, but not with the corresponding switches associated with motor 4A. These interlocks, which are of the normally open, time delay closing type, are shown for simplicity as actuated by the same armatures that actuate the switch elements 111 and 112, and the switch elements 114 and 115, but in fact are actuated by the flux of the solenoids, but through delayed action elements of well known commercial design. The facts that they are not directly actuated by the same armatures and that their actuation is accomplished only afer a slight time delay, are indicated by the letters TD.

When the contact members 111 and 112 are closed, the motor 4B is driven in one direction by current passing from 70 through conductor 91, switch 93, 111, 95, conductor 96, commutating winding 97, motor armature 98, conductors 99 and 102, switch 103, 112, 104, conductor 105, series field 78, and the conductor 76, etc. When the switches 114 and 115 are closed, the motor is driven in the opposite direction by current passing from conductor 70 to conductor 76, as follows: via conductor 92, switch 94, 114, 101, conductors 100 and 99, motor armature 98, commutating winding 97, conductor 106, switch 107, 115, 108, conductor 109 and the series field 78.

The safe off, front light or rear light device 120 may now be considered. This device is controlled by the handle 47 and is diagrammatically shown as comprising three contact elements 121, 122 and 123 all movable together, and movable in one direction or the other from a central "off" position. A suitably fused line 124 leads from the positive line 62 to and is suitably permanently connected to the contact element 121. Contacts 125 and 126 are selectively engageable by contact element 121 as it is moved in opposite directions. These are connected together as at 127. Both are connected through a conductor 128 with the relay switch 68 controlled by the overload coil 67 and thence by a conductor 129 to the fast-slow-reset device 150 later described. Contact 126 is connected by a branching conductor 132 to the front headlight FH and to the rear headlight RH and the other sides of the front and rear headlights are respectively connected to the contacts 122 and 123 by conductors 133 and 134. Stationary contacts 135 and 136, respectively engageable by the movable contacts 122 and 133 are connected by conductors 137 and 138, and a common conductor 139 with a line 140 which is connected to the negative side of the battery 61 by way of a fuse 141 and a portion of the conductor 83. From the foregoing description it will be clear that either headlight may be turned on, dependent on the direction of movement of the device 120, and it will further be noted that there is a branch 142 of the line 129 which connects with one side of an interlock switch mechanism associated with the main line switch M and which is closed when the main line switch closes, and which when closed establishes a holding circuit for the main line switch through a conductor 144 leading to the negative conductor 140. Moreover, when interlock switch 143 is closed, current is supplied to the fast-slow-reset mechanism as later noted, but attention may now be called in passing to the conductor 158.

Figure 1:
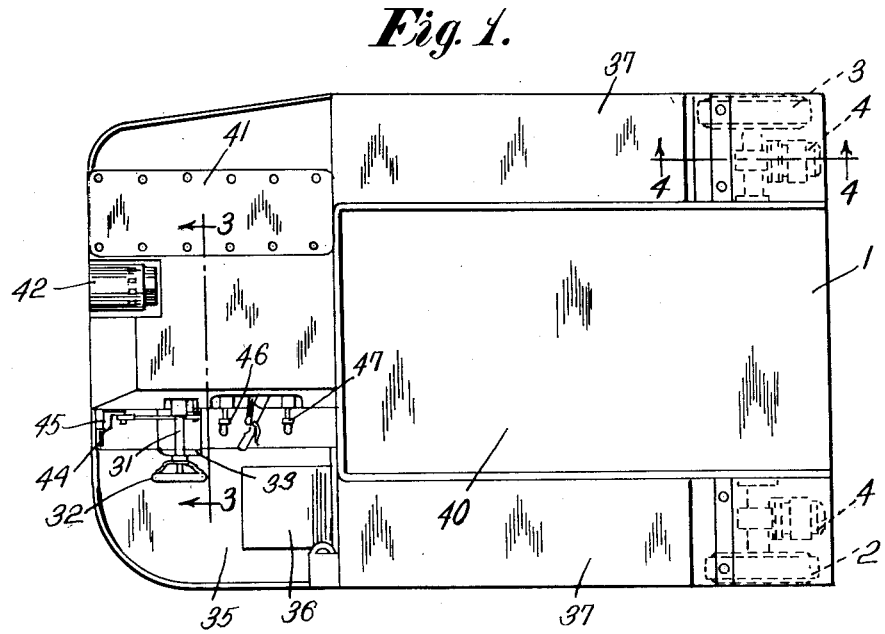
Fig. 1 is a top plan view of a vehicle—herein shown in the form of a utility mining truck—in which the illustrative embodiment of our invention is embodied.
Figure 2:
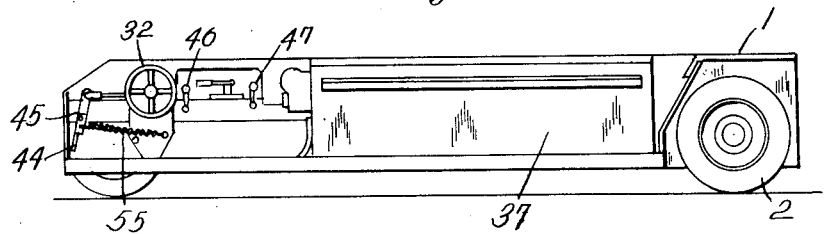
Fig. 2 is a side elevation of the vehicle shown in Fig. 1.
Figure 3:
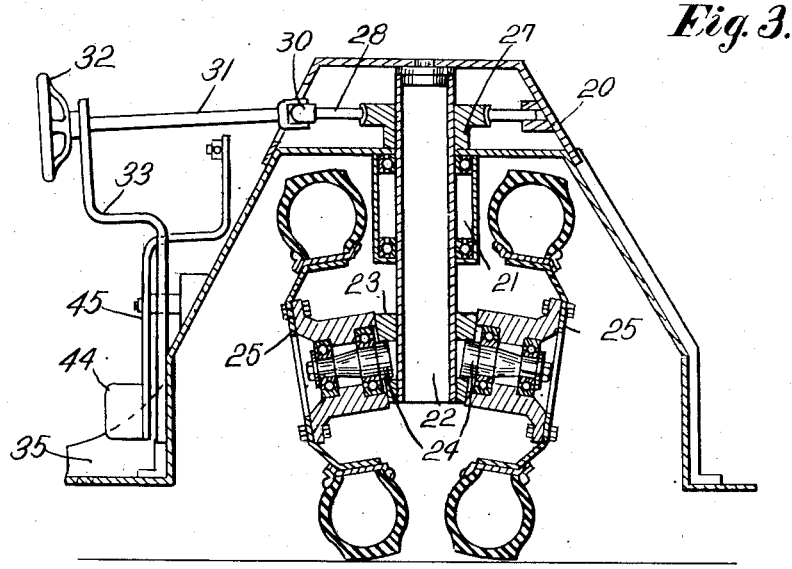
Fig. 3 is a transverse, vertical section on the plane of the line 3—3 of Fig. 1, illustrating steering devices.
Figure 4:
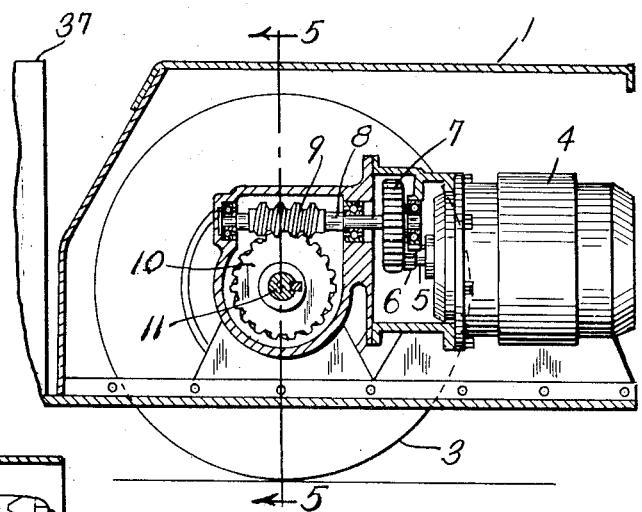
Fig. 4 is a fragmentary, longitudinal, vertical section on the plane of the line 4—4 of Fig. 1 showing an illustrative wheel driving unit.
Figure 5:
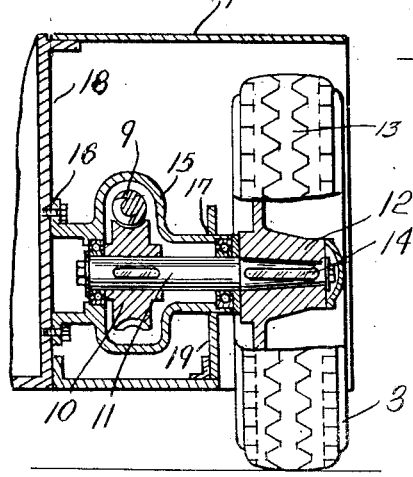
Fig. 5 is a vertical, transverse section on the plane of the line 5—5 of Fig. 4.

When handle 47 (shown in Fig. 2) is moved manually to the front light or rear light (depending on the contemplated direction of motion) operating position, line 129 is connected to the positive terminal of the battery 61 as follows: conductor 62, conductor 124, contact 121, contact 125 or 126 depending on the initial setting, conductor 128 (by way of conductor 127 if contact 126 is engaged), and the normally closed contacts of overload relay 68.

The fast-slow-reset mechanism is generally designated 150, as noted above, and it is operable by the foot lever 44 and includes a reset arrangement, an arrangement for effecting connection of the motors in series, and an arrangement for effecting their connection in parallel. These are diagrammatically illustrated at 151, 151A, and 151B. While any suitable arrangement may be used in practice, the device 151 is shown as comprising a contact 152 to which positive line 129 leads, a contact 153 connected to a contact element 157 by a conductor 154, and a movable contact 155 which connects the contacts 152 and 153 when the three devices 151, 151A and 151B are in "reset" position. The contact 157 of the device 150 is connected by a conductor 158 to the lower end of the main line switch solenoid 159, at a point nearer the latter than the interlock 143. Contact 157 is adapted to engage a stationary contact 160 and when so engaged to effect closure of switch S and connection of the motors 4B and 4A in series to the battery 61. Movable contact 161 of device 151B is adapted to cooperate with a stationary contact 162 when the foot lever is in full forward position and to thereby effect, as later described, connection of the motors in parallel to the battery. The contacts 155, 157 and 161 are movable together, but not, aside from the connection 154, electrically connected with each other.

Before describing further the functions of the mechanism 150, forward-off-reverse mechanism 170 may well be described. This includes three contact elements 171, 172 and 173, all electrically connected, and all movable together, and having a neutral position as shown, and selectively oppositely movable by the handle 46 to effect selective forward or reverse drive. Contact 171 connects with one or the other of connected contacts 175 and 176 in one of the turned positions of the device 170. It is connected by a conductor 178 with the contact 160. When device 170 is moved in one direction, contact 172 contacts a stationary contact 180, and when device 170 is turned in the opposite direction, the contact 173 connects with a contact 181.

Contact 181 is connected by a conductor 182 having branches 183 and 184 to the solenoids 116' and 116 and these solenoids are connected by conductors 186 and 185 to the line 140. Hence when contact 173 is in engagement with contact 181 when current is delivered to 160, the motors will turn in one direction. Contact 180 is connected by a conductor 187 and branch conductors 188 and 189 to the solenoids 113 and 113', and the other ends of these solenoids are connected respectively by conductors 190 and 191 to the line 140. Thus when contact 172 and contact 180 are in contact and current is being delivered to contact 160, the motors will both turn in the other direction.

It has been noted that time delay action devices, which may now be noted to be numbered 201 and 202, are associated with the reverse switch mechanisms of motor 4B, and that in whichever direction this motor is connected to run one of these devices 201 or 202 will be closed. Their closure provides, when current is being supplied to contact 160, for current to be supplied to contact 161 a second or so after the running connections for the motors are established. This, for example, because current from 160 (when contacted by 157) will flow via conductor 178, contact 171, say contact 172, contact 180, conductors 187 and 188, the conductor 203, switch device 201, conductor 205 and conductor 206 to contact element 161, and thence may flow to line 208 when contact 161 engages contact 162. Line 208 contains, as shown, a pair of normally closed switches 209, 210, which may be opened by cams turned by the tubular shaft 22 or by the worm shaft 27, on an extended portion thereof within the casing, these cams opening the switches which they respectively engage only when the steering wheels are turned "hard over," so to speak—not necessarily to extreme position, but at an angle at which it is desirable to reduce the power exerted by the motor towards whose side of the vehicle the steering wheels have been turned. The arrangement actually illustrated involves cams C1 and C2 on the hub of the worm wheel 27. These cams and the switches may be omitted, and the conductor 208 directly connected with the conductor 211 if desired, so far as the broader aspects of the invention are concerned. Switches 209, 210 may, for example, be of the hatchway type. Beyond the switches 209, 210 the extension of line 208 is numbered 211, and it connects, by a branch 212, to a normally closed switch 213 movable with and opened by switch S when the latter is closed, the other side of switch 213 being connected by a conductor 214 to the operating coil 215 of switch P2, whose opposite end is connected by a conductor 216 to the line 140. Another branch 217 of line 211 goes to the operating coil 218 of the switch P1, and the other side of this coil 218 is connected by a conductor 219 back to the line 140. Switch P1 has a switch 221 movable with it, normally closed, but opened when switch P2 is closed, and controlling current flow to the operating coil 222 of the switch S. When contact 171 engages either 175 or 176 and current is being conducted to contact 171, current will flow by way of conductor 223 to switch 221, through the same when closed, through a conductor 224 to the operating coil or solenoid 222, closing switch S, and then to conductor 140 by way of a conductor 225. When switch P1 closes, switch S will be noted to open.

The further mode of operation may now be noted. When the device 150 is turned or moved to the right in Fig. 6, contacts 152 and 153 will be left by contact 155, and if the solenoid 159 is for any reason deenergized, as by an overload's taking place, resetting by return of contact 150 to the position shown will be necessary to reclosure of the main line switch.

Now, assuming that the device 170 has been set to predetermine the direction of motor operation, movement to the right of switch element 157 into contact with contact 160 will bring about closure of the selected direction controlling switches and closure of switch S, and the motors will be connected in series across the battery in a manner that will be obvious from what has been said, the current passing through motor 4B, through conductors 76, 75, switch S, conductors 74, 73, and motor 4A in series. When device 150 is turned further to the right and switch element 161 establishes contact with contact 162, the line 208 will be energized; and assuming that the switches 209 and 210 are closed, the solenoid 218 of switch P1 will be energized and that switch will be closed, shorting out motor 4B very briefly, and then, because closure of switch P1 opens the circuit through the solenoid 222 of switch S, the latter will open, terminating the short circuiting of motor 4B; and, as switch S opens, it will, through the movement of switch 213, close a circuit through which the solenoid 215 of switch P2 will be energized, and motor 4B will be placed in parallel with motor 4A across the battery, motor 4A having been connected across the battery when switch P1 closed.

The mode of operation of the control mechanism will be clear from what has been said, and it appears unnecessary to repeat the details of circuits established during the operations mentioned. It may be observed, however, that because the current to conductor 208 is controlled by one or the other of switches 201, 202, the motor direction control effecting actions must be completed before the devices operated off conductor 208 can be energized.

Desirably a mechanical interlock may be provided between switches P2 and S absolutely to insure against both being closed at the same time with P1 also closed through sticking of the parts or any mechanical difficulty. Such an interlock (not shown) may be in the form of a pivoted lever connected with the movable switch parts of switches S and P2 so that each may be closed separately, but not both together.

The various controls, especially the mechanisms 120, 150 and 170, and switch devices 201 and 202, are shown very much in diagrammatic form, for simplicity of illustration, and it will of course be understood that arrangements for making movable parts stationary and vice versa are all within the scope of our invention.

Now, with respect to the series-parallel operation of the motors, it will be evident that during straight line movement or movement on curves of large radius, there will be no difficulty even though one motor may develop more torque, at a slower speed on the curves just mentioned, This will, indeed, provide a differential-like action with the outside traction wheels turning faster. When, however, it is desirable to turn sharply—to cramp the wheels well around—it will be desirable to slow the vehicle down, a thing which releasing the pedal halfway and going to series motor operation will accomplish, and it will also be desirable to reduce the torque exerted by the motor on the inside of the sharp turn, and to have the advantage of the relative speeding up— a greater relative speeding up—which will follow the taking by the motor on the outside of the sharp curve of more than half of the voltage. Accordingly, in series operation, it will be seen that not only will an increased differential action be produced but also the reduction in the torque exerted by the "inside" motor will reduce the chance of tire slippage which would otherwise be much increased by reason of the fact that at the extreme angle the tires would make, with respect to the inside motor, that motor could exert little steering wheel rotative effect.

From what has been said, it will be appreciated that this invention provides a very useful and desirably functioning vehicle, having adaptability to other uses, but operative very effectively in mines. The controls, especially without the switches 209, 210 and their operating mechanisms, if these be omitted—and these are to be understood as refinements, rather than essential features of the broad phases of the invention, and might be omitted without detriment to the invention in its broad aspects—are very simple, effective, guard against harmful results of oversight, and it may be noted that even were the operator to push the pedal forwardly all the way without any delay, the motors would still be started in series, though they would in a few seconds or so pass through the series connection stage and be in parallel across the battery.

The dual motor circuit disclosed but not claimed herein is the subject matter of a divisional patent application Serial No. 790,425, filed December 8, 1947, now Patent 2,530,278—Woolf, issued November 14, 1950.

While there is in this application specifically described one form which the invention may assume in practice, it will be understood that this form of the same is shown for purposes of illustration, and that the invention may be modified and embodied in various other forms without departing from its spirit or the scope of the appended claims.

What we claim as new and desire to secure by Letters Patent is:

1. In a vehicle, a body having front and rear ends and two sides and running gear including opposed drive wheels at the sides for one end and a steering wheel arrangement for the other end, a source of current, separate series driving motors for driving said drive wheels, means for selectively connecting said motors in series with each other to said source of current or in parallel to said source of current, said connecting means including a circuit comprising a pair of coils in parallel and connected to close parallel circuits for said motors when energized and normally closed switches in series with said pair of coils, the connecting means further including circuit means to control connecting the motors in series and means governed by one of the aforesaid pair of coils to interrupt the series connection of the motors, and means governed by the angle of the steering wheel arrangement for opening said normally closed switches whereby the circuit of the pair of coils is interrupted and the aforesaid means governed by one of the aforesaid pair of coils operates to connect the motors in series.

2. In a vehicle, a body having front and rear ends and two sides and running gear including opposed drive wheels at the sides for one end and a steering wheel arrangement for the other end, a source of current, separate series driving motors for driving said drive wheels, means for selectively connecting said motors in series with each other to said source of current or in parallel to said source of current, said connecting means including a circuit comprising a pair of coils in parallel and connected to close parallel circuits for said motors when energized and normally closed switches in series with said pair of coils, the connecting means further including another circuit comprising a coil to control connecting said motors in series and a normally closed switch in series with said series control coil and connected to be opened by energizing one of the aforesaid pair of coils, and means operative when the steering wheel arrangement attains a predetermined angle to said body for opening the aforesaid normally closed switches.

3. In a vehicle, a body having front and rear ends and two sides and running gear including opposed drive wheels at the sides for one end and a steering wheel arrangement for the other end, a source of current, separate series driving motors for driving said drive wheels, means for selectively connecting said motors in series with each other to said source of current or in parallel to said source of current, said connecting means including a circuit comprising a pair of coils in parallel and connected to close parallel circuits for said motors when energized and a pair of normally closed switches in series with each other and in series with said pair of coils, the connecting means further including circuit means to control connecting the motors in series and means governed by one of the aforesaid pair of coils to interrupt the series connection of the motors, and means operative when the steering wheel arrangement attains a predetermined angle to said body for shifting the connection of said motors with said current source from parallel to series, if they are at that instant connected in parallel to said source, said shifting means including a pair of cams actuable by the steering wheel arrangement upon movement of said arrangement into said predetermined positions, the cams being actuable as aforesaid to open said pair of switches.

4. In a vehicle, a body having front and rear ends and two sides, side rear wheels, a front, centrally disposed steering wheel arrangement, separate series driving motors for driving said rear wheels, means for changing the connections of said motors to effect their rotation in either direction, a source of electric current, means operating through the aforesaid connection changing means for selectively connecting said motors in series with each other to said source of current or in parallel to said source of current, said connecting means including a circuit comprising a pair of coils in parallel and connected to close parallel circuits for said motors when energized and normally closed switches in series with said pair of coils, the connecting means further including circuit means to control connecting the motors in series and means governed by one of the aforesaid pair of coils to interrupt the series connection of the motors, and means governed by the angle of the steering wheel arrangement for opening the aforesaid normally closed switches whereby the circuit of the pair of coils is interrupted and the aforesaid means governed by one of the aforesaid pair of coils operates to connect the motors in series.

5. In a vehicle, a body having front and rear ends and two sides, side rear wheels, a front, centrally disposed steering wheel arrangement, separate series driving motors for driving said rear wheels, means for changing the connections of said motors to effect their rotation in either direction, a source of electric current, means operating through the aforesaid connection changing means for selectively connecting said motors in series with each other to said source of current or in parallel to said source of current, said selectively connecting means including a circuit comprising a pair of coils in parallel and connected to close parallel circuits for said motors when energized and normally closed switches in series with said pair of coils, the connecting means further including another circuit comprising a coil to control connecting said motors in series and a normally closed switch in series with said series control coil and connected to be opened by energizing one of the aforesaid pair of coils, and means operative when the steering wheel arrangement attains a predetermined angle to said body for opening the aforesaid normally closed switches.

6. In a vehicle, a body having front and rear ends and two sides, side rear wheels, a front, centrally disposed steering wheel arrangement, separate series driving motors for driving said rear wheels, means for changing the connections of said motors to effect their rotation in either direction, a source of electric current, means operating through the aforesaid connection changing means for selectively connecting said motors in series with each other to said source of current or in parallel to said source of current, said selectively connecting means including a circuit comprising a pair of coils in parallel and connected to close parallel circuits for said motors when energized and a pair of normally closed switches in series with each other and in series with said pair of coils, the connecting means further including circuit means to control connecting the motors in series and means governed by one of the aforesaid pair of coils to interrupt the series connection of the motors, and means operative when the steering wheel arrangement attains a predetermined angle to said body for shifting the connection of said motors with said current source from parallel to series, if they are at that instant connected in parallel to said source, said shifting means including a pair of cams actuable by the steering wheel arrangement upon movement of said arrangement into said predetermined positions, the cams being actuable as aforesaid to open said pair of switches.

CHARLES F. BALL.
JAMES W. WOOLF.

REFERENCES CITED

The following references are of record in the file of this patent:

UNITED STATES PATENTS

| Number | Name | Date |
|---|---|---|
| Re. 12,419 | Cantono | Dec. 12, 1905 |
| 692,236 | Cantono | Feb. 4, 1902 |
| 717,071 | Brown | Dec. 30, 1902 |
| 724,021 | Lemp | Mar. 31, 1903 |
| 1,453,056 | Risser et al. | Apr. 24, 1923 |
| 1,495,788 | Franz | May 27, 1924 |
| 2,202,604 | Schlapfer | May 28, 1940 |
| 2,282,749 | Russell | May 12, 1942 |
| 2,301,152 | Strehlow | Nov. 3, 1942 |
| 2,307,966 | Sloane | Jan. 12, 1943 |
| 2,336,386 | Beck | Dec. 7, 1943 |
| 2,371,555 | Stamm | Mar. 13, 1945 |

FOREIGN PATENTS

| Number | Country | Date |
|---|---|---|
| 510,443 | France | Sept. 6, 1920 |